United States Patent
Kummer

(10) Patent No.: US 9,611,900 B2
(45) Date of Patent: Apr. 4, 2017

(54) LOW DRIVEN INERTIA DUAL CLUTCH

(71) Applicant: Eaton Corporation, Cleveland, OH (US)

(72) Inventor: Martin E. Kummer, Auburn, IN (US)

(73) Assignee: Eaton Corporation, Cleveland, OH (US)

(*) Notice: Subject to any disclaimer, the term of this patent is extended or adjusted under 35 U.S.C. 154(b) by 14 days.

(21) Appl. No.: 14/613,818

(22) Filed: Feb. 4, 2015

(65) Prior Publication Data

US 2015/0152924 A1 Jun. 4, 2015

Related U.S. Application Data

(63) Continuation of application No. 11/694,460, filed on Mar. 30, 2007, now Pat. No. 8,967,352.

(51) Int. Cl.
| | |
|---|---|
| *F16D 21/06* | (2006.01) |
| *F16D 25/0638* | (2006.01) |
| *F16D 25/10* | (2006.01) |
| *F16D 25/12* | (2006.01) |

(52) U.S. Cl.
CPC ............ *F16D 25/12* (2013.01); *F16D 21/06* (2013.01); *F16D 25/0638* (2013.01); *F16D 25/10* (2013.01); *F16D 2021/0661* (2013.01)

(58) Field of Classification Search
CPC ...... F16D 21/06; F16D 25/0638; F16D 25/10; F16D 25/12; F16D 2021/0661
USPC ......... 192/85.24, 85.25, 87.1, 87.11, 48.601, 192/48.609, 48.611–48.613, 48.8, 48.91, 192/85.39, 106 F; 74/330
See application file for complete search history.

(56) References Cited

U.S. PATENT DOCUMENTS

| | | |
|---|---|---|
| 2,687,198 A | 8/1954 | Greenlee |
| 3,300,004 A | 1/1967 | Peterson |
| 3,351,169 A | 11/1967 | McIndoe |
| 3,566,707 A | 3/1971 | Schultz |
| 3,638,773 A | 2/1972 | Lewis et al. |
| 3,749,217 A | 7/1973 | Bush et al. |
| 3,750,789 A | 8/1973 | Buchelt |
| 3,823,802 A | 7/1974 | Winzeler et al. |
| 3,872,956 A | 3/1975 | Herr et al. |
| 4,027,758 A | 6/1977 | Gustavsson et al. |
| 4,134,483 A | 1/1979 | Horsch |
| 4,385,429 A | 5/1983 | Crankshaw |
| 4,450,944 A | 5/1984 | Fujioka et al. |
| 4,458,794 A | 7/1984 | Yater |
| 4,574,926 A | 3/1986 | Bubak |
| 4,629,050 A | 12/1986 | Valier |
| 4,648,493 A | 3/1987 | Schilling et al. |
| 4,667,796 A | 5/1987 | Uchibaba |

(Continued)

FOREIGN PATENT DOCUMENTS

WO WO-2004/104439 12/2004

*Primary Examiner* — Terry Chau
(74) *Attorney, Agent, or Firm* — Fishman Stewart PLLC

(57) ABSTRACT

A clutch apparatus includes a clutch pack having a plurality of friction disks. The clutch pack will selectively transfer torque from a torque supplying member to a first torque receiving member. The apparatus also includes a first piston chamber positioned radially outward of the clutch pack. The first piston chamber is operably connected to the clutch pack for exerting a compressive force on at least a portion of the clutch pack as a first fluid is pressurized into the first piston chamber.

18 Claims, 4 Drawing Sheets

(56) References Cited

U.S. PATENT DOCUMENTS

| | | |
|---|---|---|
| 5,232,418 A | 8/1993 | Aoki et al. |
| 5,495,927 A | 3/1996 | Samie et al. |
| 5,577,581 A | 11/1996 | Eberwein et al. |
| 5,743,369 A | 4/1998 | Lorriette |
| 6,202,814 B1 | 3/2001 | Braford, Jr. |
| 6,206,163 B1 | 3/2001 | Schneider |
| 6,244,407 B1 | 6/2001 | Kremer et al. |
| 6,382,382 B1 | 5/2002 | Avny et al. |
| 6,464,059 B1 | 10/2002 | Kundermann et al. |
| 6,523,657 B1 | 2/2003 | Kundermann et al. |
| 6,543,597 B2 | 4/2003 | Tanikawa |
| 6,615,966 B2 | 9/2003 | Kato |
| 6,827,191 B2 | 12/2004 | Kuhstrebe |
| 6,881,107 B2 | 4/2005 | Roycroft |
| 6,907,973 B2 | 6/2005 | Schiele et al. |
| 6,929,107 B2 | 8/2005 | Hegerath |
| 6,968,935 B2 | 11/2005 | Biermann et al. |
| 7,021,447 B2 | 4/2006 | Duwel |
| 7,082,850 B2 | 8/2006 | Hughes |
| 7,104,378 B2 | 9/2006 | Martin |
| 7,114,605 B2 | 10/2006 | Grosspietsch et al. |
| 7,121,392 B2 | 10/2006 | Braford et al. |
| 2004/0206599 A1 | 10/2004 | Hegerath |
| 2005/0189195 A1* | 9/2005 | Heinrich ................ F16D 21/06 192/48.61 |
| 2006/0042904 A1 | 3/2006 | DeMaziere |
| 2006/0042909 A1 | 3/2006 | DeMaziere |
| 2006/0086586 A1 | 4/2006 | Braford |
| 2006/0144665 A1 | 7/2006 | Janson et al. |

\* cited by examiner

LOW DRIVEN INERTIA DUAL CLUTCH

CROSS-REFERENCE TO RELATED APPLICATIONS

This application is a continuation application of U.S. patent application Ser. No. 11/694,460, filed on Mar. 30, 2007, which is incorporated in its entirety.

TECHNICAL FIELD

The disclosure relates to clutches for torque transmission.

BACKGROUND

Twin-clutch, twin-shaft, dual shaft, or dual clutch transmissions of the alternating shifting type are well known in the prior art. Various types of twin clutch transmissions have been proposed and put into practical use, particularly in the field of wheeled motor vehicles. Traditional twin clutch transmissions are of a type in which gears are parted into two groups, each group having an individual main clutch, so that the operative condition of each group of gears is carried out by selectively engaging a corresponding main clutch. Twin clutch transmissions are used in vehicles to improve the transition from one gear ratio to another and, in doing so, improve the efficiency of the transmission. The gears of each group are typically individually engaged so as to rotatably connect a transmission input shaft to a transmission output shaft for transmitting torque at differing ratios. The differing ratios may be engaged by multiple shift clutches.

A typical dual clutch is illustrated in commonly owned U.S. Pat. No. 7,082,850, to Hughes, the disclosure of which is hereby incorporated by reference in its entirety. Many main clutches for dual clutch transmissions include clutch packs, having a plurality of clutch disks, for engaging and disengaging each gear group with the engine. In some applications, the clutches are actuated by hydraulic pistons for engaging and disengaging each clutch pack. Typically, the clutch packs are located radially outside of the hydraulic pistons to prevent fluids that are heated by the clutch packs from contacting the outer surfaces and seals of the piston assemblies.

SUMMARY

A clutch apparatus includes a clutch pack having a plurality of friction disks. The clutch pack will selectively transfer torque from a torque supplying member to a first torque receiving member. The apparatus also includes a first piston chamber positioned radially outward of the clutch pack. The first piston chamber is operably connected to the clutch pack for exerting a compressive force on at least a portion of the clutch pack as a first fluid is pressurized into the first piston chamber.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
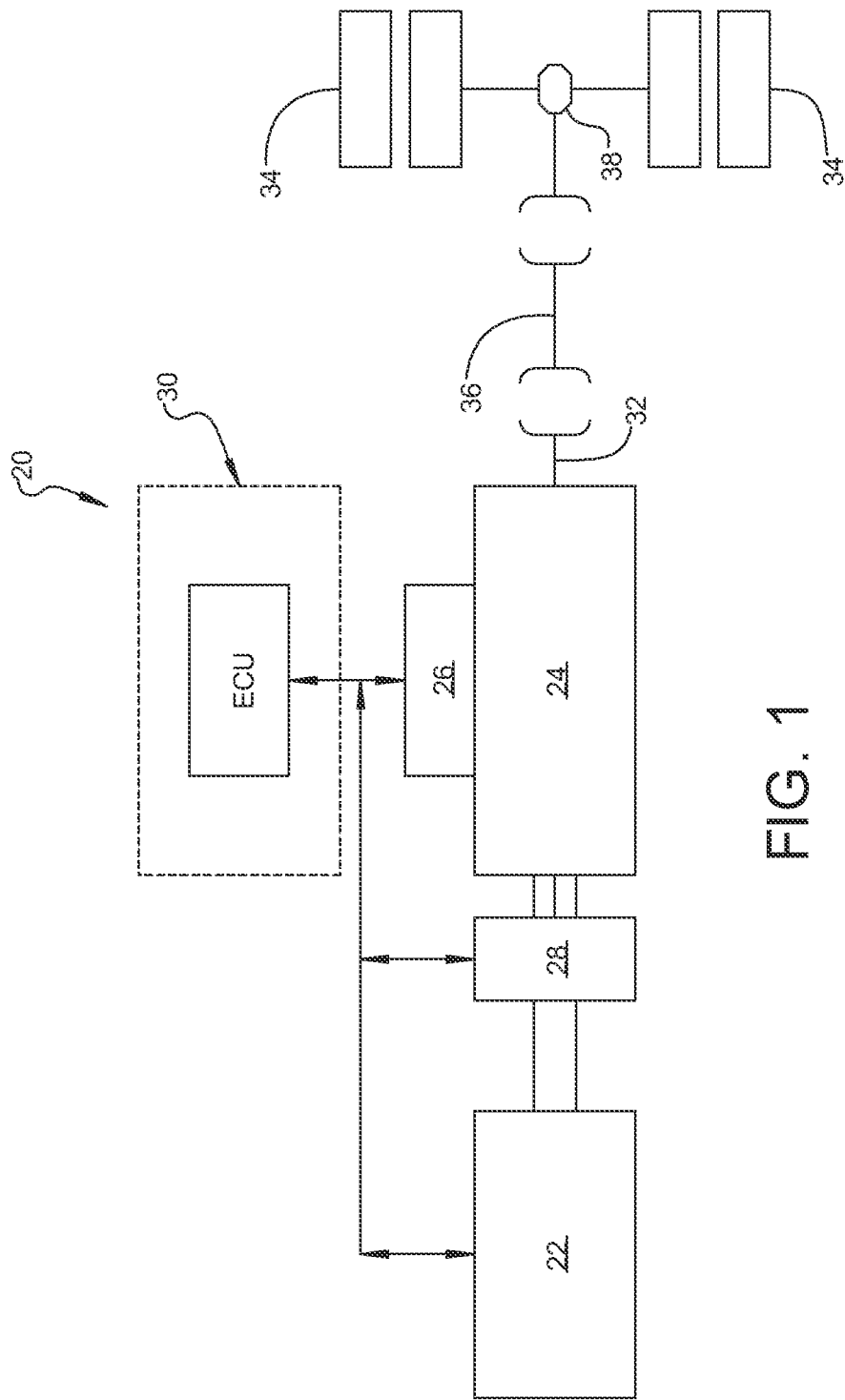
FIG. 1 is a schematic illustration of a vehicle according to an embodiment.

FIG. 1 illustrates a powertrain system 20 is shown in accordance with an embodiment. In the illustrated embodiment, the powertrain system 20 includes a prime mover 22, such as a spark-ignited or compression-ignited internal combustion engine, and a transmission 24. A shift control system 26 operates to engage and disengage gear ratios within the transmission 24, as discussed in greater detail below. A main clutch assembly 28 is positioned between the prime mover 22 and transmission 24 to selectively engage/disengage the prime mover 22 from transmission 24.

In an embodiment, powertrain system 20 also includes an electronic control unit (ECU) 30 for controlling operation of the prime mover 22, main clutch assembly 28 generally defining an axis A-A, and transmission 24. The ECU 30 may include a programmable digital computer that is configured to receive various input signals, including without limitation, the operating speed of the prime mover 22, transmission input speed, selected transmission ratio, transmission output speed and vehicle speed, and processes these signals accordingly to logic rules to control operation of powertrain system 20. For example, ECU 30 may be programmed to deliver fuel to the prime mover 22 when the prime mover 22 functions as an internal combustion engine. To support this control, each of the prime mover 22, and main clutch assembly 28 may include its own control system (not shown) contained within ECU 30. However, it will be appreciated that the present invention is not limited to any particular type or configuration of ECU 30, or to any specific control logic for governing operation of powertrain system 20. A transmission output torque from an output shaft, or output member, 32 is distributed to wheels 34 through a drive shaft 36 and a differential 38.

Figure 2:
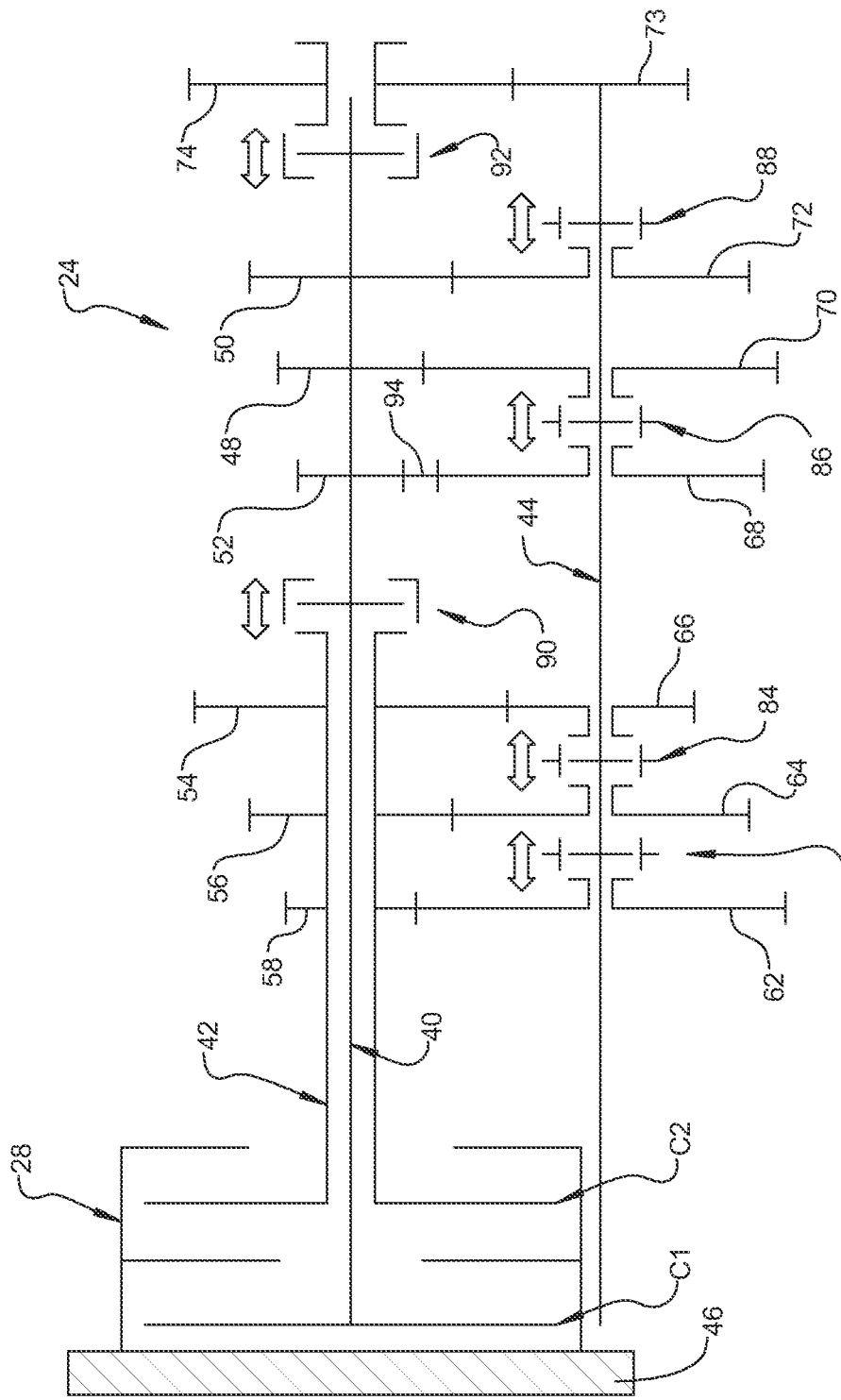
FIG. 2 is a schematic illustration of a transmission and twin clutch arrangement according to an embodiment.

FIG. 2, illustrates an embodiment of the transmission 24 to include a first input shaft 40, a second input shaft 42, a countershaft 44 that extends substantially parallel with first and second input shafts 40 and 42, and a plurality of gears which are arranged on and/or around shafts 40, 42 and 44. Although shafts 40, 42 and 44 are illustrated as being mounted in a common plane in FIG. 2, these shafts may be arranged in different planes.

In the embodiment shown in FIG. 2, first input shaft 40 is connectable to an output member 46 of the prime mover 22, such as a flywheel, through a first main clutch C1 that is used to establish even speed gearing (viz., second speed gearing, fourth speed gearing and reverse gearing), while second input shaft 42 is connectable to flywheel 46 through a second main clutch C2 that is used for establishing odd speed gearing (viz., first speed gearing, third speed gearing and fifth speed gearing). In an embodiment, first and second main clutches C1 and C2 are of a normally ON type, which assumes the ON (viz., engaged) state due to a biasing force of a spring and the like under a normal condition and establishes the OFF (viz., disengaged) state due to work of a hydraulic or electric actuator upon receiving a given instruction. Engagement and disengagement of first and second main clutches C1, C2 may function automatically under the control of ECU 30, and without intervention of a vehicle driver, when powertrain systems operates like an "automatic" transmission.

To first input shaft 40 there are connected a 2nd speed input gear 48, a 4th speed input gear 50 and a reverse input gear 52, such that gears 48, 50 and 52 rotate together with first input shaft 40. Similarly, to second input shaft 42 there are connected a 5th speed input gear 54, a 3rd speed input gear 56 and a 1st speed input gear 58, such that gears 54, 56 and 58 rotate together with second input shaft 42. The number of input gears provided on first and second input shafts is not limited to the number shown in FIG. 2, and may include more or less input gears depending on the number of ratios desired in the transmission. The term "gear," as stated herein, is used to define the toothed wheels schematically illustrated in FIG. 2, as well as manufacturing the toothed features of the wheels directly into first and second input shafts 40, 42 and countershaft 44.

To countershaft 44 there are rotatably connected a 1st speed output gear 62, a 3rd speed output gear 64, a 5th speed output gear 66, a reverse output gear 68, a 2nd speed output gear 70 and a 4th speed output gear 72. Thus, output gears 62-72 rotate around countershaft 44. Like input gears 48-58, the number of output gears provided on countershaft 44 is not limited to the number schematically illustrated in FIG. 2.

Referring still to FIG. 2, 1st speed output gear 62, 3rd speed output gear 64 and 5th speed output gear 66 are meshed with 1st speed input gear 58, 3rd speed input gear 56 and 5th speed input gear 54, respectively. Similarly, reverse output gear 68, 2nd speed output gear 70, and 4th speed output gear 72 are meshed with reverse input gear 52 (through idler 94), 2nd speed input gear 48, and 4th speed input gear 50, respectively. In another embodiment, transmission 24 may include a second countershaft (not shown) that includes one or more of the output gears rotatably disposed on first countershaft 44.

To countershaft 44 there is also integrally connected a final drive pinion gear 73 that rotates together with countershaft 44. Final drive pinion 73 is arranged perpendicular to an axis of a rotational output member 74, such as a final drive ring gear, and is meshed with output member 74. In the embodiment shown in FIGS. 1 and 2, a transmission output rotation from drive pinion 73 to output member 74 is distributed to wheels 34 through a drive shaft 36 and a differential 38.

Referring again to FIG. 2, transmission 24 also includes axially moveable clutches 82, 84, 86 and 88, such as synchronized single or double acting dog-type clutches, which are splined to countershaft 44 for rotation therewith. Clutch 82 is moveable by a conventional shift fork (not shown) in an axial direction toward main clutch assembly 28 to fix countershaft 44 for rotation with 1st speed output gear 62. Similarly, clutch 84 may be moved in opposite axial directions to rotationally fix output gear 64 or output gear 66 to countershaft 44. Clutch 86 may be selectively moved in opposite axial directions to rotationally fix output gear 68 or output gear 70 to countershaft 44. Clutch 88 may be moved in an axial direction toward main clutch assembly 28 to fix countershaft 44 for rotation with output gear 72. In another embodiment, clutches 82, 84, 86 and 88 may also be provided on first and second input shafts 40, 42 to engage and disengage gears rotatably supported on input shafts 40, 42 in a manner substantially similar to the manner in which the gears are engaged on countershaft 44.

In an embodiment, the transmission 24 also includes axially moveable input shaft clutches 90 and 92, such as synchronized single acting dog-type clutches, which are splined to first input shaft 40 for rotation therewith. In the illustrated embodiment, clutch 90 may be moved in an axial direction toward main clutch assembly 28 to fix first input shaft 40 for rotation with second input shaft 42. Similarly, clutch 92 may be moved in an axial direction away from main clutch assembly 28 to fix first input shaft 40 for rotation with output member 74.

As described above, ECU 30 delivers commands to the components of powertrain system 20 based on the receipt and evaluation of various input signals. These commands may include gear ratio interchange commands to a shift control device that indirectly moves clutches 82, 84, 86, 88, 90 and 92 to establish the gear ratios between first and second input shafts 40, 42 and countershaft 44. The shift control system 26 may be a conventional device, or any other suitable device that controls the axial position of each of clutches 82, 84, 86, 88, 90 and 92.

Operation of hybrid powertrain system 20 will now be described with reference to FIG. 2. In a first mode of operation employed during vehicle launch and acceleration, first and second main clutches C1 and C2 are initially disengaged and clutch 82 is moved leftward from the neutral position shown in FIG. 2, so that 1st speed output gear 62 is fixed to countershaft 44 by clutch 82. Upon this movement, power from prime mover 22 may be transmitted to countershaft 44 by engaging second main clutch C2. The power applied to second input shaft 42 is transmitted through 1st speed input gear 58 to countershaft 44 through 1st speed output gear 62, and then to final drive pinion 73 so that a first speed ratio is established in transmission 24.

As the vehicle accelerates and the second speed ratio is desired, clutch 86 is moved rightward from the neutral position shown in FIG. 2, so that 2nd speed output gear 70 is fixed to countershaft 44 by clutch 86. The engagement of clutch 86 occurs while first main clutch C1 is disengaged and no power is being transmitted from prime mover 22 to first input shaft 40. Once clutch 86 is engaged, the currently engaged second main clutch C2 is disengaged while simultaneously or nearly simultaneously engaging first main clutch C1. The resulting power applied to first input shaft 40 is transmitted through 2nd speed input gear 48 to countershaft 44 through 2nd speed output gear 70, and then to final drive pinion 73 so that a second speed ratio is established in transmission 24. This process is repeated, including the selective activation of the appropriate clutch, in the same manner for up-shifting through the remaining gear ratios, and in a reverse manner for down-shifting from one gear ratio to another.

To achieve the reverse gear in transmission 24, first and second main clutches C1 and C2 are disengaged and clutch 86 is moved leftward from the neutral position shown in FIG. 2, so that reverse output gear 68 is fixed to countershaft 44 by clutch 86. The power applied to first input shaft 40 is transmitted from reverse input gear 52 to countershaft 44 through an idler gear 94 and reverse output gear 68, and then to final drive pinion 73.

Under a normal operating state, wherein transmission 24 assumes a certain speed gearing, both first and second main clutches C1 and C2 may be kept in their engaged conditions while one of clutches 82, 84, 86, and 88 is kept at a given power transmitting position. For example, when transmission 24 assumes the 5th speed ratio, both first and second main clutches C1 and C2 may be engaged while clutch 84 is engaged with 5th speed output gear 66 and clutches 82, 86 and 88 are in their neutral position shown in FIG. 2. Although first and second main clutches are engaged, no power is transmitted through the unselected output gears 62, 64, 68, 70 and 72 because the output gears are free to rotate on countershaft 44 when not engaged by a corresponding clutch 82, 86 or 88.

In the embodiment shown in FIG. 2, gears 58 and 62 establish a "low" gear ratio between second input shaft 42 and countershaft 44 when clutch 82 fixes gear 62 for rotation with countershaft 44. Gears 54 and 66 establish a "high" gear ratio between second input shaft 42 and countershaft 44 when clutch 84 fixes gear 66 for rotation with countershaft 44.

Figure 3:
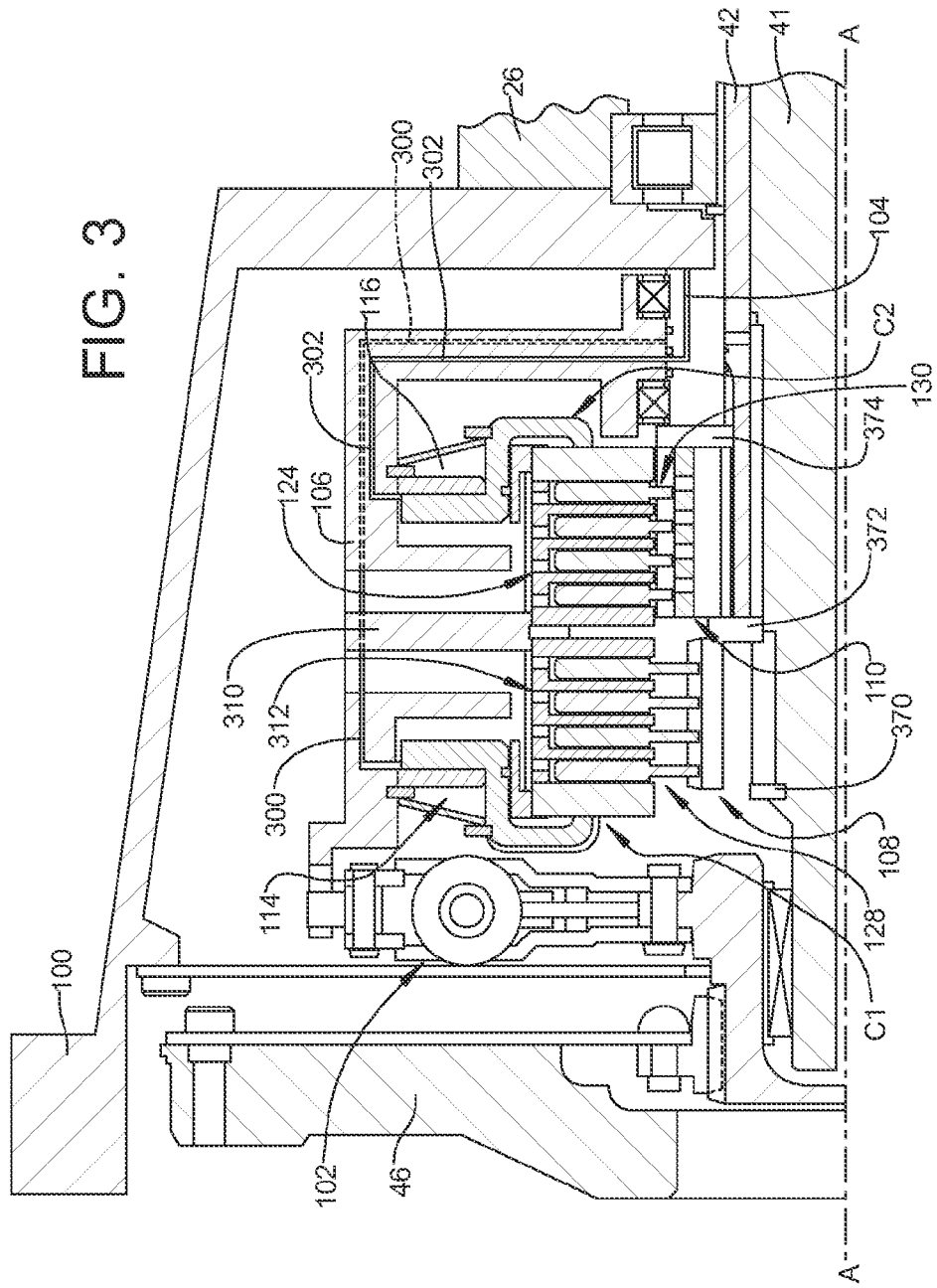
FIG. 3 is a partial sectional view of a twin clutch arrangement according to an embodiment.

As best seen in FIG. 3, the main clutch assembly 28 includes a housing 100, a damper 102, a clutch collar 104, a clutch drum 106, a first clutch hub 108, a second clutch hub 110, a first piston assembly 114, and a second piston assembly 116.

The housing 100 is connected to a portion of the transmission 24 and the prime mover 22. In the embodiment illustrated, the damper 102 is a lubricated noise, vibration and harshness (NVH) damper for reducing at least undesired drivetrain torque oscillations and other vibrations. The clutch drum 106 is coupled to an outer portion of the damper 102 for rotation therewith.

In the embodiment illustrated, the clutch drum 106 includes a plurality of annular first drum disks 122 and a plurality of annular second drum disks 124 extending radially therefrom. The first clutch hub 108 includes a plurality of annular first hub disks 128 extending radially therefrom. The second clutch hub 110 includes a plurality of annular second hub disks 130 extending radially therefrom. The first drum disks 122 are interleaved with the first hub disks 128, and the second drum disks 124 are interleaved with the second hub disks 130, as described in greater detail below.

Figure 4:
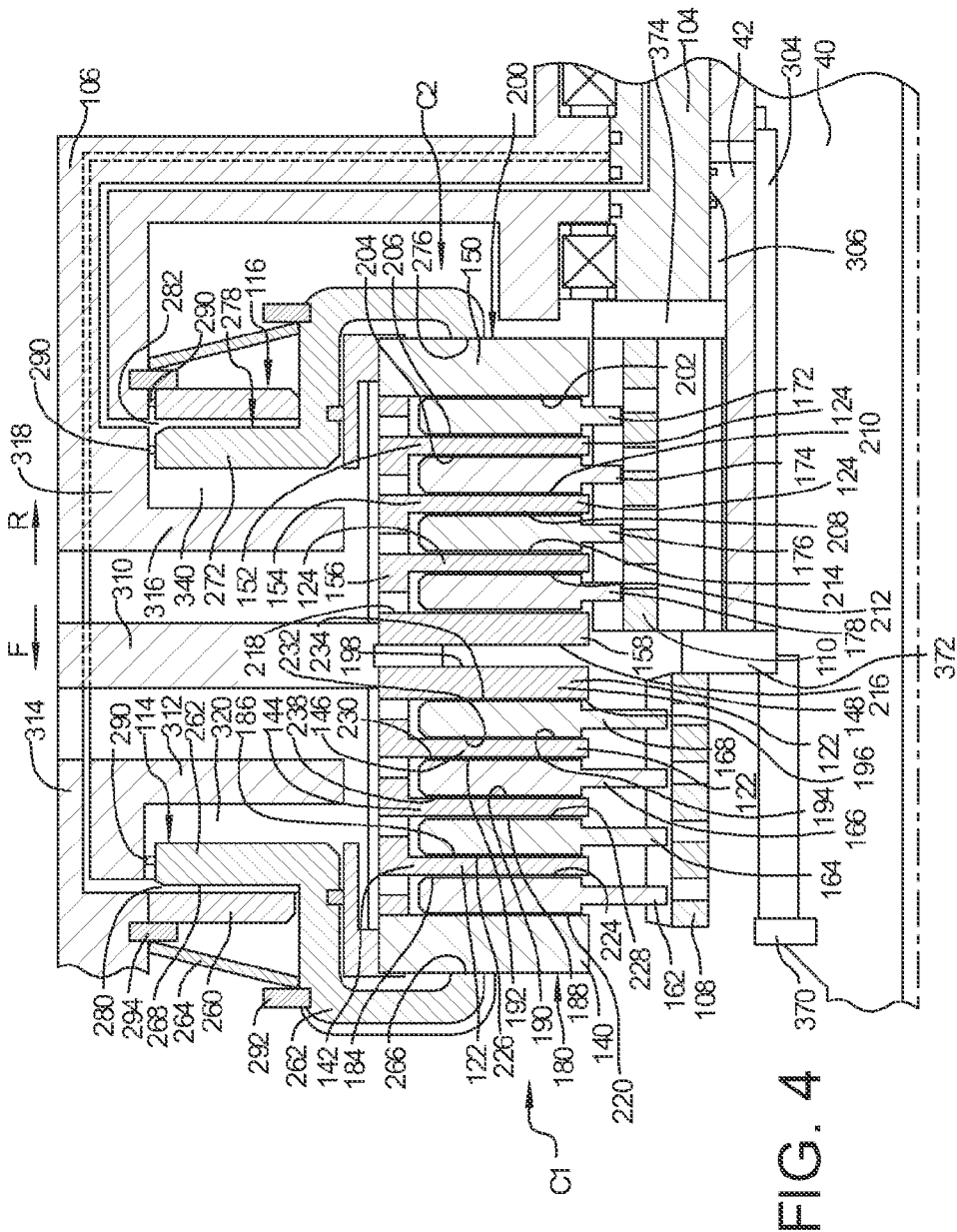
FIG. 4 is an enlarged view of portion 4 of FIG. 3.

FIG. 4 illustrates an enlarged portion of the main clutch assembly 28 of FIG. 3. As best seen in FIG. 4, the first drum disks 122 include a first pressure plate 140, a first drum first disk 142, a first drum second disk 144, a first drum third disk 146, and a first reaction plate 148. The second drum disks 124 include a second pressure plate 150, a second drum first disk 152, a second drum second disk 154, a second drum third disk 156, and a second reaction plate 158. The first hub disks 128 include a first hub first disk 162, a first hub second disk 164, a first hub third disk 166, and a first hub fourth disk 168. The second hub disks 130 include a second hub first disk 172, a second hub second disk 174, a second hub third disk 176, and a second hub fourth disk 178.

The first pressure plate 140 includes a first pressure plate forward surface 180 and a first pressure plate rearward surface 182. The first drum first disk 142 includes a first drum first disk forward surface 184 and a first drum first disk rearward surface 186. The first drum second disk 144 includes a first drum second disk forward surface 188 and a first drum second disk rearward surface 190. The first drum third disk 146 includes a first drum third disk forward surface 192 and a first drum third disk rearward surface 194. The first reaction plate 148 includes a first reaction plate forward surface 196 and a first reaction plate rearward surface 198.

The second pressure plate 150 includes a second pressure plate forward surface 200 and a second pressure plate rearward surface 202. The second drum first disk 152 includes a second drum first disk forward surface 204 and a second drum first disk rearward surface 206. The second drum second disk 154 includes a second drum second disk forward surface 208 and a second drum second disk rearward surface 210. The second drum third disk 156 includes a second drum third disk forward surface 212 and a second drum third disk rearward surface 214. The second reaction plate 158 includes a second reaction plate forward surface 216 and a second reaction plate rearward surface 218.

The first hub first disk 162 includes a first hub first disk forward surface 220 and a first hub first disk rearward surface 222. The first hub second disk 164 includes a first hub second disk forward surface 224 and a first hub second disk rearward surface 226. The first hub third disk 166 includes a first hub third disk forward surface 228 and a first hub third disk rearward surface 230. The first hub fourth disk 168 includes a first hub fourth disk forward surface 232 and a first hub fourth disk rearward surface 234.

The second hub first disk 172 includes a second hub first disk forward surface 240 and a second hub first disk rearward surface 242. The second hub second disk 174 includes a second hub second disk forward surface 244 and a second hub second disk rearward surface 246. The second hub third disk 176 includes a second hub third disk forward surface 248 and a second hub third disk rearward surface 250. The second hub fourth disk 178 includes a second hub fourth disk forward surface 252 and a second hub fourth disk rearward surface 254.

The first piston assembly 114 includes an annular first apply plate 260, an annular first piston 262, an annular first return spring 264. The first piston 262 includes a first piston reaction surface 266 and a first piston apply surface 268. The second piston assembly 116 includes an annular second apply plate 270, an annular second piston 272, an annular second return spring 274. The second piston 272 includes a second piston reaction surface 276 and a second piston apply surface 278. The clutch drum 106, the first apply plate 260 and the first piston 262 define an annular first piston chamber 280. The clutch drum 106, the second apply plate 270 and the second piston 272 define an annular second piston chamber 282. The first piston assembly 114 and the second piston assembly 116 include annular piston seals 290 for sealing the piston chambers 280, 282. In the embodiment illustrated, the first return spring 264 is axially restrained by a first piston retaining ring 292 and a first drum retaining ring 294. The second return spring 274 is axially restrained by a second piston retaining ring 296 and a second drum retaining ring 298.

In the embodiment illustrated, the piston seals 290 are constructed of a material that will withstand heated fluid from the clutch disks 122, 124, 128, 130, such as DuPont™ Vamac®, or other suitable material.

The clutch collar 104 supplies fluid to the clutch drum 106, which supplies fluid to the first piston assembly 114, the second piston assembly 116, and the clutch disks as discussed in greater detail below. The clutch drum 106 includes a first piston chamber port 300, and a second piston chamber port 302. The shafts 40, 42 define a first clutch cooling port 304 and a second clutch cooling port 306. The clutch collar 104 is adapted to supply a cooling fluid (not shown) to the ports 300, 302 and control the pressure thereof, as is conventionally known.

The clutch drum 106 is further defined by a central web 310, an annular first balance chamber wall 312, a cylindrical first balance chamber connecting wall 314, a second balance chamber wall 316, and a cylindrical second balance chamber connecting wall 318. The first piston 262, the first balance chamber wall 312, and the first balance chamber connecting wall 314 define a first balance chamber 320. The clutch drum 106 is also defined by a first coolant passage 322, a first reservoir 324, a first cooling first inlet 326, a first cooling second inlet 328, a first cooling third inlet 330, and a first cooling fourth inlet 332. The second piston 272, the second balance chamber wall 316, and the second balance chamber connecting wall 318 define a second balance chamber 340.

As the main clutch assembly 28 rotates about the axis A-A (FIG. 3), fluid supplied through the ports 300, 302, 304, 306 will tend to rotate with the main clutch assembly 28 and will be accelerated away from the axis A-A. As fluid present within the first piston chamber 280 and the second piston chamber 282 is accelerated away from the axis A-A, the fluid will bias the respective piston 262, 272 away from the respective apply plate 260, 270 and act against the biasing force of springs 264, 274. Additionally, the fluid supplied through the ports 304, 306 will cool the clutch disks 122, 124 then fill the balance chambers 320, 340.

When fluid pressure is supplied through the first piston chamber port 300, the first piston 262 will move in the rearward direction (illustrated as the arrow R in FIGS. 3 and 4) as the first apply plate 260 remains generally stationary relative to the clutch hub 106. The first return spring 264 is axially deflected due to interference between the first piston retaining ring 292 and the first hub retaining ring 294 as the first piston 262 moves in the direction R, biasing the first piston in the direction of arrow F. As the first piston 262 moves in the direction R, the first piston will move toward the first balance chamber wall 312 and reduce the volume of fluid within the first balance chamber 320. Generally, the volume of fluid that is forced into the first piston chamber 280 is equal to the volume of fluid that is displaced from the first balance chamber 320, thereby maintaining the rotational weight and the rotational inertia of the main clutch assembly 28.

As the first piston 262 moves in the direction of the arrow, the first piston reaction surface 266 urges the first pressure plate 140 toward the first reaction plate 148, thereby actuating the first clutch C1. While the first clutch C1 and the second clutch C2 are illustrated as a clutch pack having interleaved disks, the clutches used in the main clutch assembly may be any clutch configuration, having any number of engaging frictional surfaces.

By providing components of the main clutch assembly 28, such as the clutch disks 122, 124, 128, 130 interposed radially within the piston assemblies 114, 116, the resulting clutch assembly may have a desirably shorter axial length when compared to clutch assemblies that have components orientated solely in an axial orientation. Generally, the weight of the clutch disks 122, 124, 128, 130 is greater than the weight of the piston assemblies 114, 116. Accordingly, positioning the clutch disks 122, 124 radially inward of the piston assemblies 114, 116 will result in a main clutch assembly 28 with a lower rotational inertia when compared to a clutch assembly having clutch packs positioned radially outward of piston assemblies. In the embodiment illustrated, the clutch disks 122, 124, 128, 130 are axially adjacent with a minimum number of clutch components positioned between the clutch disks 122, 124, 128, 130 and the shafts 40, 42 to further decrease the rotational inertia of the main clutch assembly 28.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A clutch apparatus comprising:
    a piston having a first axial piston face and a second axial piston face that is opposite the first axial face;
    a clutch pack having a plurality of friction disks that selectively transfer torque from a torque supplying member to a torque receiving member;
    a piston chamber positioned radially outward of the clutch pack and operably connected to the clutch pack for exerting a compressive force on the first piston face as a fluid is forced into the piston chamber from a piston chamber port; and
    a balance chamber formed at least partially between the second piston face and a wall of the balance chamber;
    wherein:
        as the fluid is forced into the piston chamber port and against the first piston face, the fluid is displaced from the balance chamber via pressure from the second piston face, causing the piston to move axially away from a return spring and toward a second piston, and against an axial bias force of the return spring; and
        a volume of the fluid that is forced into the piston chamber is generally equal to a volume of the fluid that is displaced from the balance chamber, thereby maintaining a rotational weight and a rotational inertia of the clutch apparatus.

2. The apparatus of claim 1, further comprising the return spring axially restrained by a piston retaining ring and a drum retaining ring, wherein the return spring provides the axial biasing force in a first direction upon the piston.

3. The apparatus of claim 2, wherein when the fluid is forced into the piston chamber, the piston is caused to displace axially in a second direction that is opposite the first direction and toward the second piston.

4. The apparatus of claim 1, wherein the clutch pack includes a clutch hub coupled to a plurality of hub disks and a clutch drum coupled to a plurality of drum disks, wherein at least a subset of the hub disks are interleaved with the drum disks.

5. The apparatus of claim 4, wherein the clutch hub is splined for mating with a transmission input shaft.

6. The apparatus of claim 1, wherein the piston chamber port is positioned radially external to the piston chamber, and wherein the piston chamber port is in fluid connection with the piston chamber to provide the fluid to the piston chamber.

7. The apparatus of claim 1, further comprising an annular piston seal positioned between the piston chamber and the balance chamber for sealing the piston chamber from the balance chamber.

8. A torque transmitting apparatus for a vehicle, comprising:
    a first clutch pack having a plurality of friction disks that selectively transfer torque from a torque supplying member to a first torque receiving member;
    a second clutch pack having a plurality of friction disks that selectively transfer torque from the torque supplying member to a second torque receiving member;
    wherein each of the first and second clutch packs include:

a piston chamber positioned radially outward of the clutch pack and operably connected to a respective clutch pack for exerting a compressive force on a first face of a respective piston as a fluid is pressurized into each respective piston chamber from a respective piston chamber port such that the pistons move axially toward one another and away from respective return springs, and against axial bias forces of the return spring; and a balance chamber formed at least partially between a second face of each piston and a wall of a respective balance chamber, wherein a volume of the fluid that is forced against the second face and into the respective piston chamber is generally equal to a volume of the fluid that is displaced from the respective balance chamber, thereby maintaining a rotational weight and a rotational inertia of each clutch pack.

9. The torque transmitting device of claim 8, wherein each of the first and second clutch packs include the respective return spring axially restrained by a piston retaining ring and a drum retaining ring, wherein each return spring provides the axial biasing forces upon each respective piston such that the pistons are biased away from one another by their respective return spring.

10. The torque transmitting device of claim 8, wherein each clutch pack includes a clutch hub coupled to a plurality of hub disks and a clutch drum coupled to a plurality of drum disks, wherein at least a subset of the hub disks are interleaved with the drum disks.

11. The torque transmitting device of claim 10, wherein each clutch hub is splined for mating with a transmission input shaft.

12. The torque transmitting device of claim 8, wherein each respective port is positioned radially external to its piston chamber, and wherein the port is in fluid connection with the respective piston chamber to provide the fluid into the respective piston chamber.

13. The torque transmitting device of claim 8, wherein each clutch pack includes an annular piston seal positioned between each respective piston chamber and balance chamber for sealing them from one another.

14. A torque transmitting apparatus for a vehicle, comprising:
a first clutch that selectively transfers torque from a torque supplying member to a first torque receiving member;
a second clutch that selectively transfers torque from the torque supplying member to a second torque receiving member;
a first piston assembly positioned radially outward of the first clutch and including a first piston for exerting an axial force on the first clutch via a first amount of a fluid against a first face of the first piston; and
a second piston assembly positioned radially outward of the second clutch and including a second piston for exerting an axial force on the second clutch via a second amount of fluid against a first face of the second piston;
wherein each of the first and second piston assemblies include a balance chamber formed at least partially between a respective second face of each piston and a wall of a respective balance chamber, wherein a volume of the fluid that is forced into a respective piston chamber is equal to a volume of the fluid that is displaced from the respective balance chamber, thereby maintaining a rotational weight and a rotational inertia of each piston assembly while the first and second piston assemblies move axially toward one another and away from respective first and second return springs, and against axial bias forces of the first and second return springs.

15. The apparatus of claim 14, wherein each of the first and second piston assemblies includes one of the first and second return springs axially restrained by a piston retaining ring and a drum retaining ring, wherein each return spring provides the axial biasing forces upon each respective piston such that the pistons are biased away from one another by their respective return spring.

16. The torque transmitting device of claim 14, wherein each clutch includes a clutch hub coupled to a plurality of hub disks and a clutch drum coupled to a plurality of drum disks, wherein at least a subset of the hub disks are interleaved with the drum disks.

17. The torque transmitting device of claim 16, wherein each clutch hub is splined for mating with a transmission input shaft.

18. The torque transmitting device of claim 14, wherein each piston assembly includes a respective port positioned radially external to its piston chamber, wherein the port is in fluid connection with the respective piston chamber to provide the first amount or the second amount of the fluid into the respective piston chamber.

* * * * *